March 13, 1945.    J. ROGOFF    2,371,469
TOOL INSTALLED CABLE TERMINAL AND METHOD OF MAKING SAME
Filed May 27, 1942
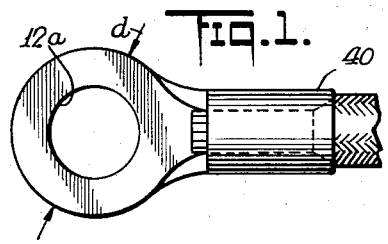
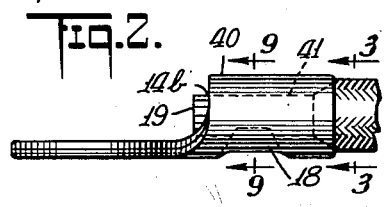
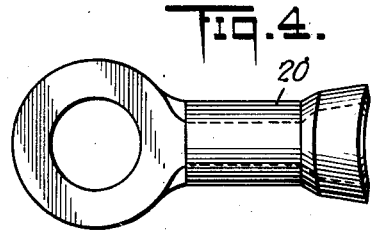
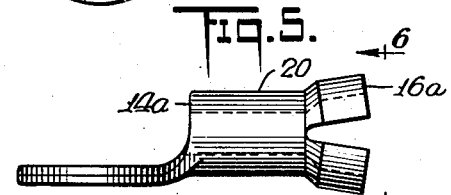
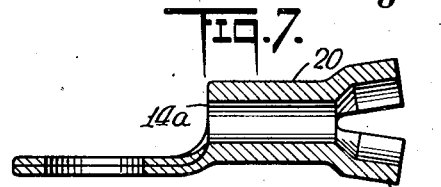
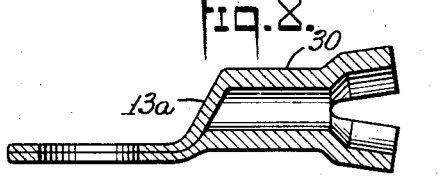
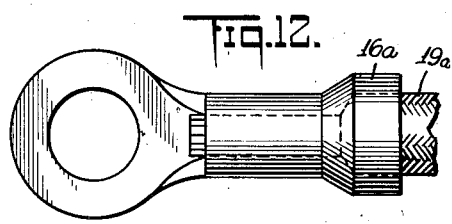
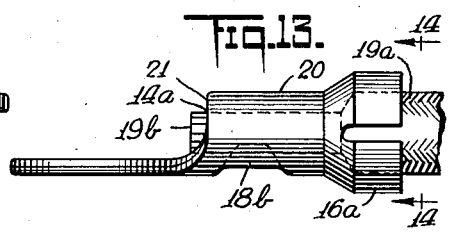
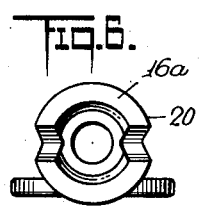
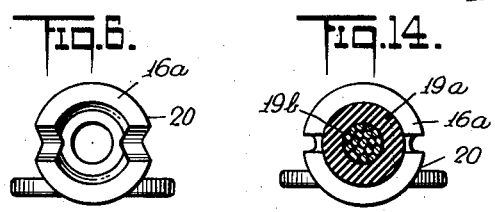
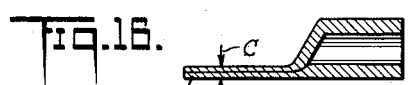
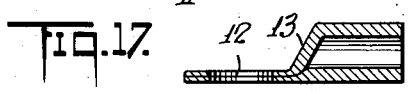
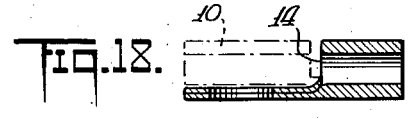
INVENTOR
*Julian Rogoff*
BY
*Harry Ernest Rubens*
ATTORNEY Patented Mar. 13, 1945

2,371,469

UNITED STATES PATENT OFFICE 2,371,469

TOOL INSTALLED CABLE TERMINAL AND METHOD OF MAKING SAME

Julian Rogoff, New Rochelle, N. Y., assignor to Burndy Engineering Company, Inc., a corporation of New York Application May 27, 1942, Serial No. 444,751

2 Claims. (Cl. 173—269)

My invention relates to that type of cable terminal or cable connector which is installed on the cable by deformation of the cable socket.

The principal object of my invention is to provide a cable terminal which may be installed on the cable by high speed, simple hand tool methods.

Another object of my invention is to provide a cable terminal suitable for manufacture by high speed, mass production methods.

Still another object of my invention is to provide a cable terminal which may be installed by deforming the cable socket in any one of a variety of ways and which does not require special tools applied in a special or critical manner. A further object of my invention is to provide a cable terminal which will grip more than one cable size.

Another object of my invention is to provide a cable terminal of minimum size and weight to accomplish the other objects.

Another object of my invention is to provide a cable terminal with a cable covering gripping "shroud" which will grip cable coverings of various diameters with equal efficiency.

Another object of my invention is to provide a cable terminal which can be readily inspected to ascertain whether the cable is gripped properly.

In electrical wiring of the control, communications, power and lighting circuits of ships and aircraft, large numbers of cable terminals are necessary. Because of space and weight limitations inherent in both ship and aircraft construction, such cable terminals must be of minimum dimensions and weight. At the same time, the joints made by these cable terminals must be electrically and mechanically sound, in spite of the severe corrosive and vibratory conditions to which they are often exposed.

Because of the large quantities of cable terminals employed, they must be capable of being manufactured, installed and inspected by high speed methods. This fact justifies the installation of specialized equipment for manufacturing and installing them. Paradoxically, these terminals must also be capable of installation by readily available tools, such as pliers, because the aircraft and ships equipped with them must be maintained and serviced at maintenance depots and repair stations scattered at numerous widely spaced localities. To equip all such maintenance depots with special installation tools and equipment would be difficult, and, in certain circumstances, impossible.

The communications and control cables used in ships and aircraft are usually made up of a number of fine strands. Under the severe vibration sometimes encountered in ships and aircraft, these strands may break at terminal points where they are rigidly gripped. In addition, the stresses imposed on the strands when the cable is pulled through conduit or during other installation processes, may cause the strands to break. For this reason it is desirable to incorporate an insulation gripping shroud as part of the terminal, to relieve the cable strands of stress at the point where they are gripped by the terminal. Because of the fact that different cable manufacturers make the cable insulation, for the same cable size, of different wall thicknesses, the shroud must be so designed as to accommodate and properly hold a range of insulation diameters.

Although in many respects the requirements of terminals for shipboard and aircraft are identical, in one respect they differ considerably. For shipboard use it is desirable that the back of the barrel of the terminal be closed in order to provide convenient means for sealing the end of the cable against the entrance of moisture. If this is not done, moisture, especially salt moisture, may penetrate into the cable, traveling between the strands, and eventually this moisture may cause failure of the insulation. My terminal, when made with a closed back, provides for a seal against such moisture.

In aircraft, the closed back, not being subjected to ship conditions, is not necessary. In fact, it is more desirable that terminal barrels be provided with open backs so that inspectors may make certain that the cable is inserted all the way into the barrel. Convenience of inspection is very important in aircraft manufacture, where large numbers of connections must be inspected in minimum time. Accordingly, my terminal can be provided with an inspection hole at the back end of the barrel by notching this point at the proper step in the manufacture of the terminal.

I have found that in order to obtain good mechanical and electrical characteristics, especially on small diameter cables, it is desirable that my terminal barrel be made with a relatively thick wall. This wall thickness may be approximately one-third of the diameter of the wire, and preferably should be approximately half the diameter of the wire. Whereas, terminals with thinner walls are rather critical insofar as the type of indentation is concerned, I have found that my terminal with its heavy wall may be indented in a variety of ways, that is, longitudinally, circumferentially or transversely with good results, mechanically or electrically. In order to be able to indent the terminals conveniently, in such a variety of ways, it is necessary that the metal of which the terminal barrels are made, be annealed to a temper which is no harder than ¼ hard.

When I flatten the tongue of my terminal from tube of proper wall thickness for the barrel of the terminal, I find that ordinary flattening will provide a tongue too thick and narrow. The extra thickness causes difficulty when several terminals are stacked on a single stud, because the studs used in aircraft and shipboard terminal blocks necessarily of limited lengths, may not be sufficiently tall to stack the required number of terminals. A tongue which is too narrow may be useless because a large enough hole cannot be provided in it to fit over the stud. I eliminate both difficulties by swaging my tongue with sufficient pressure to cause the metal to flow. I direct the flow of the metal so that the tongue becomes thinner and widens. In doing so, I actually cause both metal thicknesses comprising the tongue of the terminal to become approximately the same thickness as the single wall thickness of the barrel of my terminal. In causing the metal of the tongue to flow, I gain the additional advantage of cold working, and thereby hardening the tongue, and thus provide a terminal made of a single piece of metal having two different physical characteristics, obtaining a terminal which is relatively soft in the barrel which must be soft to be indented properly, and hard and strong in the tongue which must be strong to withstand forces exerted on it when it is gripped on the stud by means of a tightened nut.

I accomplish these and other objects and obtain my new results as will be apparent from the device described in the following description, particularly pointed out in the claims, and illustrated in the accompanying drawing in which:

Figures 1, 2, and 3 show a top, side and end view respectively of one modification of my terminal, without an insulation gripping shroud.

Figures 4, 5 and 6 show a top, side and end view respectively, of my terminal made with an insulation gripping shroud.

Figures 7 and 8 show longitudinal sectional views of my terminal with open back and closed back respectively.

Figures 9, 10, and 11 show sectional views indicating various types of deformations in section whereby the cable socket of my terminal may be secured to the cable end.

Figures 12, 13, and 14 are top, side, and end views illustrating how the shroud of my terminal is gripped to the insulation of the wire.

Figures 15 to 20 show the series of steps required to manufacture my terminal from the tubular sleeve to the finished product. These steps are performed in progressive die equipment for high speed manufacture. This method is schematic only. Other methods may be used to obtain the same results.

Referring more particularly to the drawing, the connector terminal shown in Fig. 1, is made from the tubing 10 shown in Fig. 15. This tubing is made of relatively soft metal annealed to a temper approximately ¼ hard. The wall thickness $a$ is unusually heavy, being approximately one-half the diameter $b$ of the inner bore of the sleeve. One end of the tubing is then swaged as shown in Fig. 16, to form a tongue 11 having a thickness $c$ or approximately equal to the thickness $a$, resulting in a tongue width $d$, shown in Fig. 1, greater than that obtained by merely flattening the tubing. This swaging action results in cold working the metal of the tongue, hardening it to compensate it for loss of thickness. During this process, a central aperture 12 may be pierced into the tongue 11, as shown in Fig. 17, and generally shaped as 12a, shown in Fig. 1. The end wall 13 is thus retaining. If it is desired to form the open end type, shown in Fig. 18 where inspection is desired, a notch 14 may be transversely cut into the tube 10 for substantially half the circumference, and the tongue section flattened up to the notched portion, resulting in an open back connector.

In Fig. 19, two diametrically formed slots 15 are formed in the opposite end of the sleeve 10, where the cable is inserted, which slots are widened, as in Fig. 20, to form the bell-shaped shroud 16 for receiving and compressing the covering, or insulation of the cable. The shroud may also be formed without slots.

The connector 20 with the open end 14a is shown in section in Fig. 7, the closed end 13a illustrated in connector 30, shown in Fig. 8.

In Figures 1, 2, and 3, a connector 40, without shroud, is shown in various views, the indentation 18 formed into the connector wall 41, to secure the cable 19 thereto. This is of the open end type as shown at 14b.

In Figures 4, 5, and 6, the bell-shaped shroud type connector 20 is shown with open end 14a, shroud 16a obliquely formed to permit the cable covering 19a to be received therein, as shown in Figures 12, 13 and 14, before being compressed thereon. An indentation 18b is formed in the connector wall 21 to secure the cable 19b thereto.

In Figures 9, 10 and 11, three different types of indentation are shown, varying from the longitudinal type 18c in Fig. 9, to the semi-cylindrical type 18d in Fig. 10 to the flattened type 18e in Fig. 11.

Thus, the soft annealed wall permits a wide variety of methods for securing the strands of the cable to the connector wall, depending on the tools at hand.

The flattened tongue is compressed to prevent moisture or liquids from leaking into the tubular body section. Similarly, the shrouds of the connectors may be flattened on the insulation of the cable by a similar variety of tools. The inner surface of the shroud may be serrated or roughened to provide additional gripping values, if desired.

I have by the foregoing accomplished the objects of my invention.

The use of relatively soft tubular stock, with work hardened swaged tongue sections, provides me with the physical characteristics desirable for their respective functions. The slotted end section permits the use of a cable covering for additionally securing the cable to the connector wall. Simplicity of design permits mass production, establishing low prices, insuring wide distribution, permitting the replacement of former designs which were more difficult to install.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What I claim and desire to secure by Letters Patent, is as follows:

1. A one piece solderless terminal connector having a hollow tubular body made of unswaged ductile metal suitable for indentation, and a tongue section having two walls, and made of hard swaged metal, said two walls of the tongue section having a combined thickness substantially equal to a single wall thickness, of the unswaged tubular body, the reduction of thickness of the terminal tongue section being compensated for by the increase in strength of the swaged metal.

2. The method of manufacturing a one piece solderless terminal connector which comprises the step of providing a tubular body made of ductile metal hardenable by swedging, flattening one end of the tubular body to form a tongue section having double walls, swedging to harden the double wall of the tongue section to substantially that of a single thickness of the wall of the unswaged tubular body, and thereafter trimming the swaged section to form a terminal tongue.

JULIAN ROGOFF.